United States Patent [19]

Sheem

[11] Patent Number: 4,507,775

[45] Date of Patent: Mar. 26, 1985

[54] OPTICAL TRANSMITTER WITH LIGHT SOURCE AND OPTICAL AMPLIFIER COMBINATION

[75] Inventor: Sang K. Sheem, Richardson, Tex.

[73] Assignee: Rockwell International Corporation, El Segundo, Calif.

[21] Appl. No.: 507,876

[22] Filed: Jun. 27, 1983

[51] Int. Cl.[3] .......................... H04J 7/00; H04B 9/00
[52] U.S. Cl. ........................ 370/4; 455/618; 455/608; 455/611; 370/77
[58] Field of Search ............... 455/618, 613, 609, 610, 455/608, 611; 370/112, 114, 77, 116, 119

[56] References Cited

U.S. PATENT DOCUMENTS 3,724,926  4/1973  Lee .................................. 455/618
4,207,434  6/1980  Riley ................................ 370/112

Primary Examiner—Joseph A. Orsino, Jr.
Assistant Examiner—Timothy K. Greer
Attorney, Agent, or Firm—V. Lawrence Sewell; Howard R. Greenberg; H. Fredrick Hamann

[57] ABSTRACT

A transmitter for fiber optics communication having a solid state light source device biased to emit light and a solid state optical amplifier device positioned adjacent the source device to receive the emitted light and amplify it. A modulation current is provided to one of the devices so as to cause a corresponding modulation of the output light from the optical amplifier, for transmission of the information contained in the modulation. The invention is advantageous for multiple state digital encoding. In addition, it can generate a multiplexed output, which facilitates demultiplexing of the information transmitted.

1 Claim, 4 Drawing Figures

OPTICAL TRANSMITTER WITH LIGHT SOURCE AND OPTICAL AMPLIFIER COMBINATION

BACKGROUND OF THE INVENTION

This invention relates to a transmitter for a fiber optics communication system, and more particularly a transmitter employing a combination of a semiconductor light source and semiconductor optical amplifier.

A semiconductor optical amplifier may be the same as a semiconductor laser, except for the range of electrical inputs and light outputs in which the device is operated. This type is called a Fabry-Perot amplifier. The other type is the so-called traveling-wave amplifier. The optical amplifier receives a light input, and it has an electrical current input which is not large enough to cause lasing. In the appropriate operation range, the amplifier provides an amplified light output which varies in relation to the electrical current and in relation to the light input.

The amplification provided by an optical amplifier is largest when light input is smallest. Accordingly, such amplifiers have come to be used at the receiving end of a fiber optics communication link, where the optical power in the fiber has been attenuated by the transmission. In such applications, the amplifier can provide a relatively large gain factor, such as 50. At the light power levels emitted by a laser or LED at the transmission end of a fiber optic link, the amplifier can only be expected to provide a gain in the range of 2 to 3. Thus, amplifiers have not been used at the transmitting end of such communication systems.

SUMMARY OF THE INVENTION

In accordance with the present invention, it has been conceived that the small gain provided by an optical amplifier at the transmitting end of an optical communication system can be used to advantage in combination with certain modulations.

For example, if the light from a semiconductor laser or LED is butt-coupled directly into an optical amplifier, and the electrical current input to the amplifier is modulated with multiple digital values, then the amplifier light output will be modulated accordingly with the multiple digital values. Not only binary digital values can be used, but, for example, a four state set of values can be employed. By thus incorporating the optical amplifier in the transmitter, light output power can be increased to levels such that no performance degradation is incurred by introducing the extra digital states, without exceeding optical output ratings of the laser or LED alone.

In another embodiment of the invention, the electrical input to the optical amplifier is varied in such a way as to give different amplifications to information from different signal channels in a multiplexed data stream. The different resulting amplitudes can be used to improve demultiplexing at the receiving end of the communication system. Again, the use of the amplifier in the modulation makes possible the introduction of multiple amplitudes, without degrading transmission performance.

DESCRIPTION OF PREFERRED EMBODIMENTS

Figure 1:
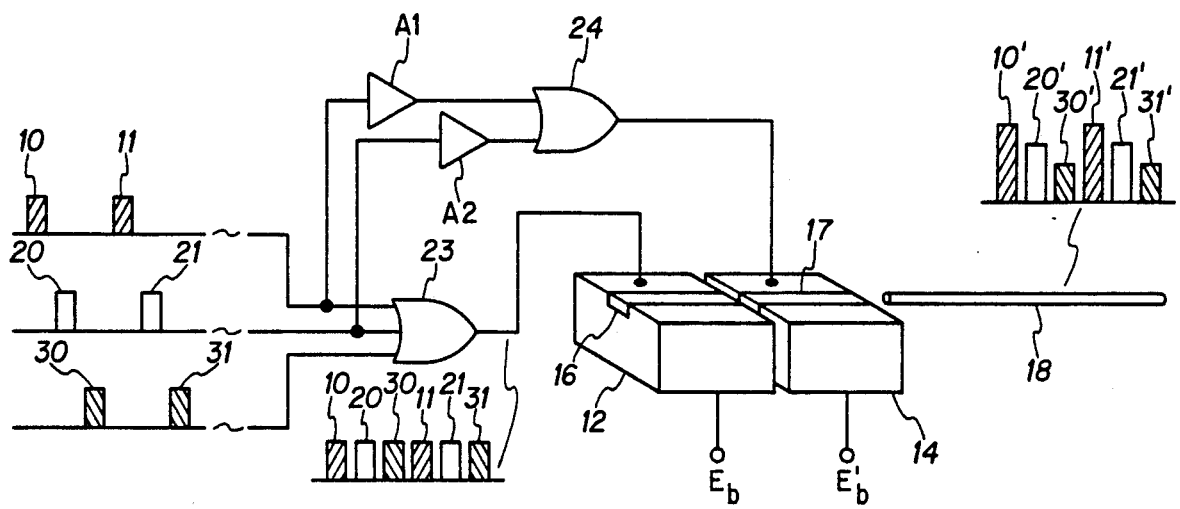
FIG. 1 is a schematic diagram of an optical transmitter in accordance with the invention, for handling time division multiplexed signals.

In FIG. 1, a solid state light source device 12 and a solid state optical amplifier device 14 are represented, somewhat schematically. The source 12 is, for example, an LED or laser. The amplifier 14 can be a Fabry-Perot Cavity type laser amplifier. In a preferred embodiment, the amplifier 14 is a Fabry-Perot Cavity of the type with an antireflection coating on one or both of its facets. Such coating increases the threshold current at which lasing occurs, making it possible to pump the amplifier harder, producing more optical gain, without lasing.

The regions 16 and 17 in the two devices 12 and 14 represent light emitting and guiding channel regions. A gap is illustrated between the two devices to emphasize that they are separate, but it will be recognized as desirable to couple the two as closely as possible, with light emitted by the source 12 being received in the light emitting region of amplifier 14. An optical fiber 18 receives the light output from the amplifier 14. The light source 12, amplifier 14 and fiber 18 can be physically arranged, for example, using hybrid circuit fabrication technique.

Light source 12 is provided with a bias $E_b$ suitable for the light emission mode employed by the source. The amplifier 14 likewise has a bias $E_b'$ placing it in the operational range suitable for amplification, but below lasing threshold.

The transmitter of FIG. 1 is to be modulated by a time division multiplexed input stream. For purposes of illustration, pulses 10 and 11, similarly cross hatched, represent digital pulses from a first signal channel. Pulses 20 and 21 are from a second channel, while pulses 30 and 31 are from a third channel. Occupying different time slots as these pulses do, they are combined by OR gate 23 to produce the pulse train indicated at the output thereof. Source 12 receives a modulating current in the form of this pulse train. For a binary digital system, information is contained in the presence or absence of pulses in the time slots. Source 12 emits light which varies as the pulse train.

Pulses 10 and 11 are also connected to an amplifier A1. Pulses 20 and 21 are connected to amplifier A2, having a different gain from amplifier A1. The outputs of these amplifiers are combined by OR gate 24 to provide a modulating current to optical amplifier 14. The result of this modulation of the optical amplifier 14 is to amplify pulses 10 and 11 from the first channel by different amounts than pulses 20 and 21 from the second channel, while for example, pulses 30 and 31 are not amplified. A possible light output in fiber 18 is illustrated by the train of pulses 10', 20', 30', etc.

The advantage of the transmitter of FIG. 1 can be understood by considering the problem of multiplexing and demultiplexing at very high rates. For example, it is difficult to electronically demultiplex a receive binary signal at 1 Gbs. By using binary digital pulses of different amplitudes corresponding to different signal channels, the receiving apparatus is aided in discriminating between the various channels. The gain provided by optical amplifier 14 permits the introduction of several amplitude levels, without the sacrifice in transmission signal/noise performance, which would be present, if the different amplitudes were achieved by simply reducing the amplitudes of some of the output pulses from source 12.

Figure 2:
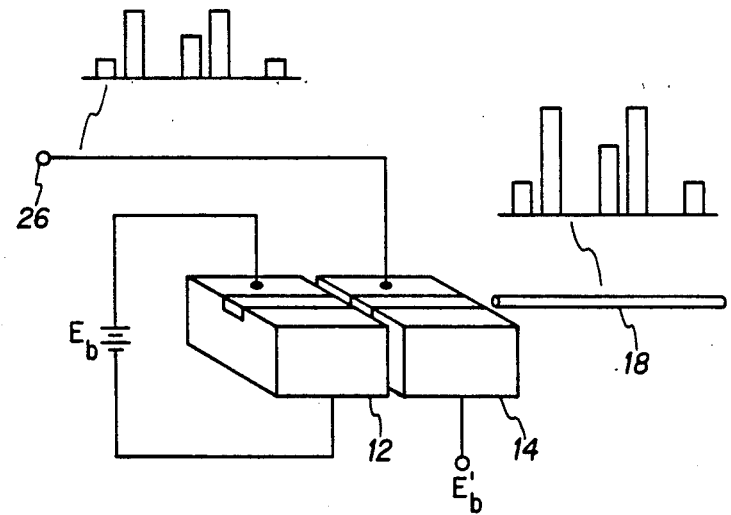
FIG. 2 is a schematic diagram of a second embodiment of the invention, in which an optical transmitter generates multiple digital state values of light output power.

FIG. 2 illustrates an embodiment of the invention for generating plural digital output light power values. In this transmitter, the light source 12 is biased appropriately to produce a constant light output. Optical amplifier 14 has provided thereto at input 26 a modulating current incorporating information encoded in a multi-level digital format. Various numbers of digital levels, including two, could be employed, but a four state digital code is illustrated in the figure. The modulating current controls the amplification by amplifier 14 of the light generated by source 12. As indicated in the figure, the output light power at fiber 18 contains the digitally encoded information applied at input 26. Again, if these various levels had been produced simply by producing various light level outputs from source 12, some of them at less than the practical maximum output of the source, transmission performance would be degraded. In the transmitter of FIG. 2, however, the encoding which uses amplifier 14 produces a higher output level of selected pulses, thereby avoiding a degrease in transmission performance.

Figure 3:
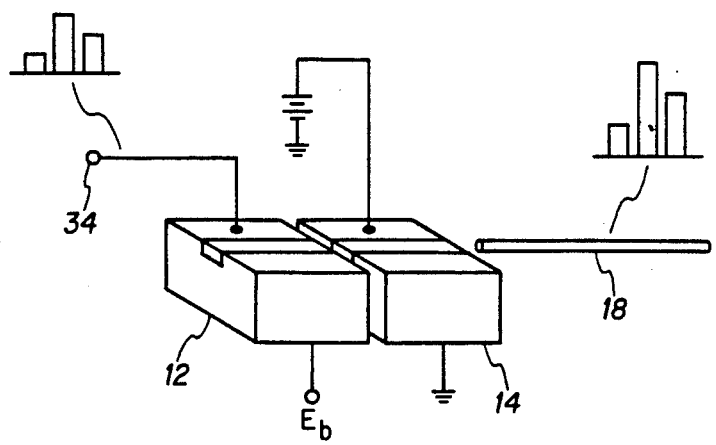
FIG. 3 is a schematic diagram of an alternative embodiment of the transmitter of FIG. 2.

The transmitter of FIG. 3 has the same goal as that of FIG. 2, but the implementation is different. In the apparatus of FIG. 3, the optical amplifier 14 is biased to a constant level of amplification, while an information encoding current is applied to source 12 at terminal 34. As indicated in the Figure, the light output power in fiber 18 contains the encoded information. As before, the use of amplifier 14 offsets a loss in signal/noise performance, which would be experienced by using less than the practical maximum light output from source 12.

Figure 4:
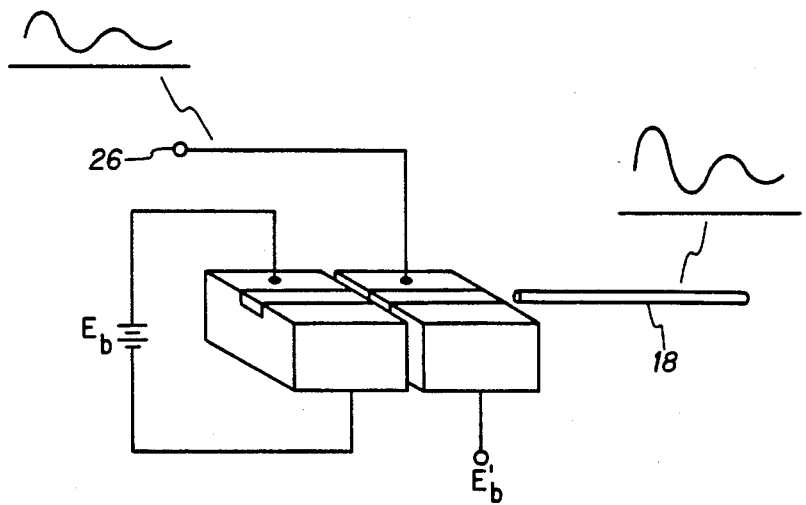
FIG. 4 is a schematic diagram of a fourth embodiment of the invention, in which the optical transmitter is modulated with an analog signal.

FIG. 4 illustrates a transmitter much like that of FIG. 2, except with an analog modulating current applied to terminal 26. As with the transmitter of FIG. 2, the modulating analog information appears in the output light power in fiber 18. Thus, the transmitter of the present invention is not limited to digital applications. Moreover, the embodiment of FIG. 3 can also be used with an analog input at terminal 34.

As will be apparent to those skilled in the art, various modifications of the foregoing specific embodiments are possible, while realizing the advantages taught by the present invention and coming within the scope of the following claims.

I claim:

1. A transmitter for fiber optics communication, comprising:
   a solid state light source device biased to emit light;
   a solid state optical amplifier device positioned adjacent said source device so as to receive the emitted light at a first power level and to emit output light at a second, greater power level;
   means for modulating said source device with digital inputs time multiplexed from a plurality of information channels; and
   means for providing a modulation current to said amplifier device, including means, synchronized with respect to said multiplexed information channel inputs, for amplifying light levels corresponding to said different information channels by different amounts, thereby to facilitate demultiplexing by a receiver.

* * * * *